Patented Apr. 29, 1930

1,756,310

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

PROCESS OF VULCANIZING RUBBER

No Drawing.   Application filed November 28, 1927.   Serial No. 236,372.

The present invention relates to the vulcanization of rubber by an improved process wherein there are employed as accelerators of that process, compounds capable of imparting highly desirable characteristics to the rubber product. The class of accelerators preferred for use in the process set forth comprise derivatives of the reaction product of a mercaptan with an organic base.

In a copending application, Serial No. 189,462, filed by the present applicant on May 6, 1927 which issued January 17, 1928, as U. S. Patent #1,656,834, there are described as accelerators of the vulcanization process, chemical products resulting from the reaction of an aldehyde upon the reaction product of a mercaptan with an organic base. The present application is a continuation in part of the application mentioned and particularly comprises as accelerating compounds, the aldehyde derivatives of the reaction product of a mercaptan, such as a mercapto-aryl-thiazole with an amine free from substituent aryl groups and preferably with an aliphatic amine containing less than six carbon atoms.

An example of one method of manufacturing one of the preferred type of new accelerating compounds is as follows. One molecular proportion (85 parts) of piperidine was reacted with one molecular proportion (167 parts) of mercapto-benzo-thiazole by mixing the materials under suitable reacting conditions. The reaction may be carried out in the presence of any common solvent of the materials, such as ether, or without the aid of a solvent, if desired. Inasmuch as the reaction is an exothermic change, the combination takes place very readily without the necessity of supplying any heat to the mixture other than that developed by the reaction itself. The resulting solid product was then treated with an aliphatic aldehyde, for example with one-half molecular proportion (35 parts) or with one molecular proportion (70 parts) of crotonaldehyde. The aldehyde product so formed was a solid, readily pulverizable to an amorphous brown product. This product was ready for use in a rubber mix in the manner as hereinafter set forth.

In a like manner the aldol derivative of the diethylamine reaction product of mercapto-benzo-thiazole and the aldol derivative of the iso-amyl-amine reaction product of mercapto-benzo-thiazole were prepared. Other aliphatic aldehyde derivatives of the reaction product of mercapto-aryl-thiazole with primary and secondary aliphatic or cyclic amines preferably containing less than six carbon atoms are obtainable in a like manner. Inasmuch as the thiazole compounds are acidic in nature and the amino compounds are basic, the products herein set forth as vulcanization accelerators may be termed the aldehyde derivatives of mercapto-aryl-thiazole salts. Since analogous products were broadly disclosed in the pending application referred to, the present application is limited in its scope to the aldehyde derivatives of those salts obtainable from the combination of a mercaptan with an aliphatic amine containing no substituent aryl groups.

The accelerating value of the various products hereinbefore set forth has been ascertained by incorporating the products in a rubber composition and vulcanizing the product. Thus, a mix was prepared in the well known manner comprising 100 parts of pale crepe rubber, 5 parts of zinc oxide, 2.5 parts of sulphur, 0.2 parts of the crotonaldehyde derivative of the reaction product of piperidine and mercapto-benzo-thiazole. The mix was then vulcanized by heating the rubber stock for two hours in a press maintained under a temperature given by a pressure of approximately ten pounds of steam per square inch. The cured stock was then tested and was found to possess a tensile strength at break of 2565 pounds per square inch and an ultimate elongation of 860%. A product possessing a much higher tensile strength would, as is evident, be obtained by use of an increased quantity of the accelerator and also by making other changes in the proportions of the ingredients set forth in the example.

As a further example of the application of the accelerators disclosed in the present invention in the manufacture of vulcanized products, a rubber mix was manufactured comprising 100 parts of pale crepe rubber, 5 parts of zinc oxide, 3.0 parts of sulphur, 0.25 parts of thermatomic black, 0.5 parts of the aldol reaction product of the diethylamine salt of mercapto-benzo-thiazole. Portions of the mix were then cured under different vulcanization conditions by heating samples of the stock for varying lengths of time in a press maintained under a temperature given by 10, 20 and 40 pounds of steam pressure to the square inch. The results obtained upon testing samples of the stock cured under the conditions set forth are as follows:

Table A

| Time of cure | Modulus of elasticity in lbs/in² at elongations of— | | | Tensile in lbs/in² at break | Ultimate elongation per cent |
|---|---|---|---|---|---|
| | 300% | 500% | 700% | | |
| 1 hour at 10 lbs. steam per sq. in. | 188 | 428 | 1735 | 3140 | 830 |
| 30 minutes at 20 lbs. steam per sq. in. | 182 | 428 | 1320 | 2750 | 830 |
| 1 hour at 20 lbs. steam per sq. in. | 230 | 527 | 2210 | 3435 | 775 |
| 15 minutes at 40 lbs. steam per sq. in. | 184 | 414 | 1445 | 3040 | 835 |
| 30 minutes at 40 lbs. steam per sq. in. | 244 | 512 | 2040 | 3105 | 830 |

The above results show that a vulcanized product of good commercial qualities resulted for a wide range of cures in stocks wherein one of the new type of accelerators was employed. Similar rubber stocks were also prepared and tested for each cure shown but in which 0.5 parts of mercapto-benzo-thiazole was employed in place of the accelerator set forth. A comparison of the results so obtained showed that the new aldehyde derivative of a secondary amine salt of mercapto-benzo-thiazole produced a cured rubber product possessing tensile strengths that were more than 25% greater at every cure than stocks in which an equal weight of mercapto-benzo-thiazole was employed as an accelerator.

Another example of the present invention is shown by employing the aldol derivative of the iso-amyl-amine reaction product of mercapto-benzo-thiazole in a stock comprising 100 parts of pale crepe rubber, 5 parts of zinc oxide, 3 parts of sulphur, 0.25 parts of thermatomic black, 0.5 parts of the accelerator indicated.

Such a compound was prepared in the ordinary and well known manner on the differential mixing mill and the compound was then vulcanized and tested. The results obtained were as follows:

Table B

| Time of cure | Modulus of elasticity at elongation of— | | | Tensile in lbs/in² at break | Ultimate elongation per cent |
|---|---|---|---|---|---|
| | 300% | 500% | 700% | | |
| 1 hour at 10 lbs. steam per sq. in. | 252 | 636 | 2670 | 3965 | 785 |
| 30 minutes at 20 lbs. steam per sq. in. | 225 | 566 | 2330 | 3995 | 810 |
| 1 hour at 20 lbs. steam per sq. in. | 292 | 649 | 2740 | 4230 | 780 |
| 15 minutes at 40 lbs. steam per sq. in. | 271 | 627 | 2700 | 3950 | 755 |
| 30 minutes at 40 lbs. steam per sq. in. | 296 | 698 | 2840 | 3285 | 750 |

The above results show that a vulcanized rubber product of particularly high quality is obtained by employing the accelerator set forth in a rubber stock vulcanized over a wide range of curing conditions. Moreover, a comparison of the stocks set forth in the example with a similar series of rubber compounds employing the same weight of mercapto-benzo-thiazole in place of the accelerator indicated, showed that vulcanized products manufactured by the aid of the new accelerator described possessed tensile strengths at all cures shown that were approximately 50% greater than the stocks in which mercapto-benzo-thiazole was employed.

Other compounding ingredients and other proportions of ingredients than those particularly set forth in the examples hereinbefore given may be employed and are apparent to those skilled in the art to which the invention pertains. Moreover, other chemical compounds may be substituted in place of those set forth in the manufacture of the accelerators and the resulting products employed in the production of vulcanized rubber. Thus, reaction products of mercapto thiazoles, such as mercapto tolyl and xylyl thiazoles, and the like, as well as other mercaptan compounds may be combined with other aliphatic secondary amines such as dimethylamine, secondary propyl and butyl amines and the like and the resulting "salts" reacted with an aliphatic aldehyde or mixture of aldehydes, preferably with aldehydes crotonizable on heating, such as acetaldehyde, acrolein and the like to produce products of the type set forth as accelerators.

In case the accelerator is manufactured by treating a volatilizable aldehyde with a melted salt of a mercaptan, it is desirable that the reaction be carried out in an inclosed chamber or that a stream of aldehyde vapor be bubbled through the melted mixture.

The invention is to be understood as not dependent upon the accuracy of any theory or reason suggested to explain the advantageous result realized. On the contrary the invention is to be regarded as limited only as defined in the following claims, in which it is my intention to claim all novelty in my invention as broadly as is possible in view of the prior art.

What is claimed is:

1. The process of vulcanizing rubber which comprises heating a mixture of rubber and sulphur in the presence of an accelerator comprising the aldehyde derivative of the reaction product of a mercapto compound containing a C—SH grouping with an aliphatic amine, said amine being free of an aryl substituent group.

2. The process of vulcanizing rubber which comprises heating a mixture of rubber and sulphur in the presence of an accelerator comprising the aldehyde derivative of the reaction product of a mercapto compound containing a C—SH grouping with a secondary amine containing less than six carbon atoms.

3. The process of vulcanizing rubber which comprises heating a mixture of rubber and sulphur in the presence of an accelerator comprising the aldehyde derivative of the reaction product of a mercapto compound containing a C—SH grouping with a secondary aliphatic amine, said amine being free of aryl substituent groups.

4. The process of vulcanizing rubber which comprises heating a mixture of rubber and sulphur in the presence of an accelerator comprising the aldehyde derivative of the reaction product of a mercapto compound containing a C—SH grouping with diethylamine.

5. The process of vulcanizing rubber which comprises heating a mixture of rubber and sulphur in the presence of an accelerator comprising the aldehyde derivative of the reaction product of a mercapto thiazole compound with an aliphatic amine, said amine being free of an aryl substituent group.

6. The process of vulcanizing rubber which comprises heating a mixture of rubber and sulphur in the presence of an accelerator comprising the aldehyde derivative of the reaction product of a mercapto-aryl-thiazole compound with a secondary amine containing less than six carbon atoms.

7. The process of vulcanizing rubber which comprises heating a mixture of rubber and sulphur in the presence of an accelerator comprising the aldehyde derivative of the reaction product of mercapto-benzo-thiazole with diethylamine.

8. The process of vulcanizing rubber which comprises heating a mixture of rubber and sulphur in the presence of an accelerator comprising the aliphatic aldehyde derivative of a mercapto-aryl-thiazole compound with an aliphatic amine containing less than six carbon atoms.

9. The process of vulcanizing rubber which comprises heating a mixture of rubber and sulphur in the presence of an accelerator comprising the aldol derivative of the reaction product of mercapto-benzo-thiazole with diethylamine.

10. The vulcanized rubber product produced by heating a mixture of rubber and sulphur in the presence of an accelerator comprising the aldehyde derivative of the reaction product of a mercapto compound containing a C—SH grouping with an aliphatic amine, said amine being free of an aryl substituent group.

11. The vulcanized rubber product produced by heating a mixture of rubber and sulphur in the presence of an accelerator comprising the aldehyde derivative of the reaction product of a mercapto-aryl-thiazole compound with an aliphatic amine containing less than six carbon atoms.

12. The vulcanized rubber product produced by heating a mixture of rubber and sulphur in the presence of an accelerator comprising the aliphatic aldehyde derivative of the reaction product of a mercapto-aryl-thiazole compound with a secondary amine containing less than six carbon atoms.

13. The vulcanized rubber product produced by heating a mixture of rubber and sulphur in the presence of an accelerator comprising the aldol derivative of the reaction product of mercapto-benzo-thiazole with diethylamine.

14. A rubber vulcanization accelerator comprising the aldehyde derivative of the reaction product of a mercapto compound containing a C—SH grouping with an aliphatic amine containing less than six carbon atoms.

15. A rubber vulcanization accelerator comprising the aliphatic aldehyde derivative of the reaction product of a mercapto-aryl-thiazole compound with a secondary aliphatic amine, said amine being free of an aryl substituent group.

16. A rubber vulcanization accelerator comprising the aldol derivative of the reaction product of mercapto-benzo-thiazole with diethylamine.

In testimony whereof I hereunto affix my signature.

WINFIELD SCOTT.